(12) United States Patent
Hong et al.

(10) Patent No.: US 9,051,443 B2
(45) Date of Patent: Jun. 9, 2015

(54) OPTICAL SHEET

(75) Inventors: Chang Pyo Hong, Yongin-si (KR);
Kyung Jong Kim, Yongin-si (KR); Sung Chul Jeong, Yongin-si (KR)

(73) Assignee: KOLON Industries, Inc., Gwacheon-Si (KR)

(*) Notice: Subject to any disclaimer, the term of this patent is extended or adjusted under 35 U.S.C. 154(b) by 297 days.

(21) Appl. No.: 12/992,840

(22) PCT Filed: May 11, 2009

(86) PCT No.: PCT/KR2009/002460
§ 371 (c)(1),
(2), (4) Date: Jan. 13, 2011

(87) PCT Pub. No.: WO2009/139560
PCT Pub. Date: Nov. 19, 2009

(65) Prior Publication Data
US 2011/0117322 A1 May 19, 2011

(30) Foreign Application Priority Data

May 16, 2008 (KR) .................. 10-2008-0045264
Apr. 27, 2009 (KR) .................. 10-2009-0036418

(51) Int. Cl.
| | |
|---|---|
| B32B 3/10 | (2006.01) |
| C08J 5/18 | (2006.01) |
| G02B 5/04 | (2006.01) |
| F21V 8/00 | (2006.01) |
| G02F 1/1335 | (2006.01) |

(52) U.S. Cl.
CPC ............ C08J 5/18 (2013.01); *Y10T 428/24802* (2013.01); *Y10T 428/24479* (2013.01);
(Continued)

(58) Field of Classification Search
CPC .......... B32B 27/08; B32B 27/36; B32B 7/12; B32B 37/182; C09D 167/06; C09D 11/102; C09D 11/06; C09D 175/04; C08L 23/0876; C08L 67/02; C08L 83/04; C08L 2666/28; C08L 29/00; C08L 101/16; C08L 2205/02; C08L 23/06; C08L 23/0869; C08L 27/12; C08L 67/025; C08L 67/03; C08L 79/08; G02B 5/208; G02B 5/22; G02B 6/102; G02F 1/133345; G02F 1/13; C07F 1/00; C08J 7/04; C08F 2/00
USPC .......... 428/156, 195.1, 480; 522/181; 528/26, 528/361, 205, 331
See application file for complete search history.

(56) References Cited

U.S. PATENT DOCUMENTS

| | | | |
|---|---|---|---|
| 2007/0030430 A1* | 2/2007 | Inoue et al. | .................. 349/137 |
| 2007/0065636 A1 | 3/2007 | Merrill et al. | |
| 2009/0135489 A1 | 5/2009 | Ryu et al. | |

FOREIGN PATENT DOCUMENTS

| | | |
|---|---|---|
| JP | 2000-239333 A | 9/2000 |
| JP | 2002-128836 A | 5/2002 |

(Continued)

OTHER PUBLICATIONS

Machine Translation of JP-A-2002-128836. May 2002.*
(Continued)

*Primary Examiner* — Maria Veronica Ewald
*Assistant Examiner* — Brian Handville
(74) *Attorney, Agent, or Firm* — Sughrue Mion, PLLC

(57) ABSTRACT

Disclosed is an optical sheet which is used in a liquid crystal display. The optical sheet is not readily damaged by external impact, and thus is easy to handle and can reduce failure rate, leading to a decrease in production cost and an increase in production efficiency. Also, it can prevent a decrease in brightness.

15 Claims, 2 Drawing Sheets

(52) U.S. Cl.
CPC ............ *C08J2333/06* (2013.01); *G02B 5/045*
(2013.01); *G02B 6/0053* (2013.01); *G02F*
*2001/133607* (2013.01)

(56) References Cited

FOREIGN PATENT DOCUMENTS

| | | | |
|---|---|---|---|
| JP | 2002-258018 | A | 9/2002 |
| JP | 2005-049795 | A | 2/2005 |
| JP | 2005-196122 | A | 7/2005 |
| JP | 2008-094987 | A | 4/2008 |
| JP | 2008-528755 | A | 7/2008 |
| KR | WO2006/080813 | * | 8/2006 |
| KR | 10-2007-0001184 | A | 1/2007 |
| KR | 10-2007-0063827 | A | 6/2007 |
| KR | 10-2008-0037066 | A | 4/2008 |
| WO | 2006/080813 | A1 | 8/2006 |

OTHER PUBLICATIONS

Machine Translation of JP-A-2008-094987. Apr. 2008.*

* cited by examiner

OPTICAL SHEET

CROSS REFERENCE TO RELATED APPLICATIONS

This application is a National Stage of International Application No. PCT/KR2009/002460 filed May 11, 2009, claiming priority based on Korean Patent Application No. 10-2008-0045264 filed May 16, 2008 and Korean Patent Application No. 10-2009-0036418 filed Apr.27, 2009, the contents of all of which are incorporated herein by reference in their entirety.

TECHNICAL FIELD

The present invention relates to an optical sheet which is used in a liquid crystal display (hereinafter referred to as an LCD).

BACKGROUND ART

Indirect light-emitting type device which displays images by controlling the transmittance of an external light source, the backlight unit, which is the light source and an important component which determines the characteristics of LCD.

Particularly, as LCD panel manufacturing technology has developed, the demand for LCD displays having high brightness has increased, and thus there have been various attempts to increase the brightness of the backlight unit. Thus, in the case of liquid crystal displays which are used as monitors, personal digital assistants (PDAs), notebook computers and the like, the display of bright light from a low-energy source is used to measure their superiority. Accordingly, in the case of an LCD, the front brightness is very important.

In an LCD, light passed through the light diffusion layer is diffused in all directions because of the structure of the LCD, and thus light which is displayed on the front side is very insufficient. For this reason, there has been a continued effort to display high brightness with low power consumption. In addition, efforts are being made to increase the viewing angle of LCD displays by increasing the area of the displays so as to enable more users to view the displays.

When the power of the backlight unit is increased for this purpose, the power consumption becomes larger and the power loss by heat also becomes larger. For this reason, in the case of portable displays, the battery capacity becomes larger and the battery life-cycle becomes shorter.

Accordingly, methods of imparting directionality to light in order to increase brightness have been suggested, and for this purpose, various lens sheets have been developed. A typical prism sheet has a prism array structure in which a number of peaks and valleys are linearly arranged side by side.

The prism structure has a triangular array structure having an inclined plane of about 45 in order to improve the brightness in the front direction. Thus, there are problems in that, because the upper portion of the prism structure is in the shape of a peak, the upper part of the peak is readily broken or worn away by a small external scratch, thus causing damage to the prism structure. Because the angle coming from the prism structures of the same type is the same between the arrays, a small collapse occurs in the triangular corner portion, or a fine scratch occurs in the inclined plane. Thus, due to the difference in the path for emitting light between the damaged area and the normal area, brightness is reduced and failure occurs. Accordingly, in some cases, an entire side of produced prism sheets cannot be used due to fine defects occurring during the production of prism sheets. This leads to a decrease in productivity and an increase in production cost. Actually, in companies which manufacture backlight unit assemblies, a failure caused by damage to the prism structure by a scratch during handling of the prism sheets is a significant problem.

Also, an operation for stacking several sheets and films is carried out during the manufacture of a backlight unit. In this operation, a plurality of prism films can be stacked in order to increase brightness. In this case, the upper portion of the lower prism film comes in contact with the lower portion of the upper prism film, thus causing a problem in that the prism structure is readily damaged.

In addition, it is a general tendency to apply structured optical sheets in view of an increase in brightness, hiding or viewing angle. When these optical sheets are mounted on the backlight unit, an operation of stacking them with other sheets or films is carried out. In this case, the upper portion of the lower prism film comes in contact with the lower portion of the upper prism film, and thus the prism structure can be readily damaged. Also, care is required in conveying such sheets or handling them in processes.

Accordingly, in order to prevent damage to such prism structures, a protective film was stacked in some cases. However, because LCD panels gradually become thinner, it is a general tendency to omit the protective film or use a sheet having combined functions. In addition, adding the process of stacking the protective film leads to an increase in production cost and a decrease in time efficiency and physical efficiency.

In addition to damaging the prism structure by handling of the prism sheet during the manufacture of backlight units, while the use of portable displays such as notebook computers and PDAs is increasing, the case in which the displays are placed in bags during movement is rapidly increasing. In this case, when impact is applied to the displays by running or a sudden stop during movement, the prism structures placed in the displays are damaged even when there is a protective film on the prism structures, thus affecting the displays.

For this reason, there is an urgent need for an optical sheet which can flexibly cope with external impact.

DISCLOSURE OF INVENTION

Technical Problem

Accordingly, one aspect of the present invention is to provide an optical sheet which can prevent damage to a structured layer so as not to be affected by external impact when applied to displays.

Another aspect of the present invention is to provide an optical sheet which prevents damage to a structured layer and thus is easy to handle.

Still another aspect of the present invention is to provide an optical sheet which can maintain the function of a prism structure by preventing a decrease in brightness caused by the difference between light paths.

Still another aspect of the present invention is to provide an optical sheet which does not require a protective film.

Still another aspect of the present invention is to provide an optical sheet which can reduce failure rate while reducing production cost and increasing production efficiency.

Yet another aspect of the present invention is to provide an optical sheet which prevents damage to a structural layer and, at the same time, is sticky, leading to excellent workability and reliability, thus reducing failure rate.

Technical Solution

In one aspect of the present invention, there is provided an optical sheet comprising a cured layer of resin whose surface is structured and which is made of a curable resin composition comprising a compound of the following formula 1, wherein the elastic recovery rate of the optical sheet, which is represented by the following equation, is more than 80% as measured when pressing the upper side of the structured surface with a flat tip at a pressing speed of 0.2031 mN/sec to a maximum compressive force of 1 $g_f$ or 2 $g_f$, maintaining the structured surface at the maximum compressive force for 5 seconds when the maximum compressive force has been reached, and then removing the compressive force:

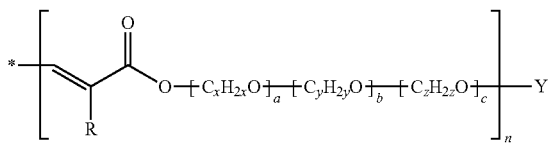

Formula 1 wherein R is a hydrogen atom or an alkyl group having 1 to 15 carbon atoms, n is an integer greater than 1, a, b and c are integers greater than 0, provided a+b+c=3, x, y and z which are the same or different are each an integer ranging from 2 to 50, and Y is a compound containing at least one benzene ring;

Elastic recovery rate=$(D_1-D_2)/D_1 \times 100$     Equation 1 wherein $D_1$ signifies a depth compressed by the application of external pressure, and $D_2$ signifies the difference between the height of the optical sheet to which external pressure has not been applied and the height of the optical sheet from which external pressure has been removed to recover the optical sheet.

In the above aspect, the compound containing at least one benzene ring may be selected from compounds represented by the following formulas 2 to 5:

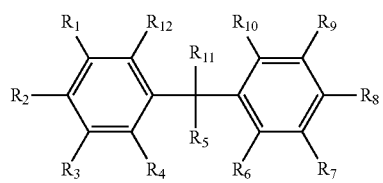

Formula 2 wherein at least one of $R_1$ to $R_{12}$ is —$C_KH_{2K}O$—, —C(=O)O—$(CH_2)_K$—CH(OH)—$(CH_2)_{K'}$—, —$(CH_2)_K$—CH(OH)—$(CH_2)_KO$— or —$C_jH_{2j}NHC(=O)$— and is linked with the acrylate moiety of formula 1 having a repeating unit represented by n, wherein K and K' are each an integer greater than 1 and j is an integer greater than 0, and the remaining radicals of $R_1$ to $R_{12}$ which are the same or different are each a hydrogen atom, an alkyl group having 1 to 15 carbon atoms, an aromatic ring having 6 to 30 carbon atoms, or a compound containing at least one oxygen, nitrogen or sulfur atom;

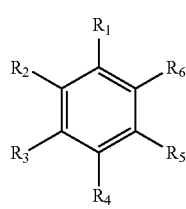

Formula 3 wherein at least one of $R_1$ to $R_6$ is —$C_KH_{2K}O$—, —C(=O)O—$(CH_2)_K$—CH(OH)—$(CH_2)_{K'}$—, —$(CH_2)_K$—CH(OH)—$(CH_2)_KO$— or —$C_jH_{2j}NHC(=O)$— and is linked with the acrylate moiety of formula 1 having a repeating unit represented by n, wherein K and K' are each an integer greater than 1 and j is an integer greater than 0, and the remaining radicals of $R_1$ to $R_6$ which are the same or different are each a hydrogen atom, an alkyl group having 1 to 15 carbon atoms, an aromatic ring having 6 to 30 carbon atoms, or a compound containing at least one oxygen, nitrogen or sulfur atom;

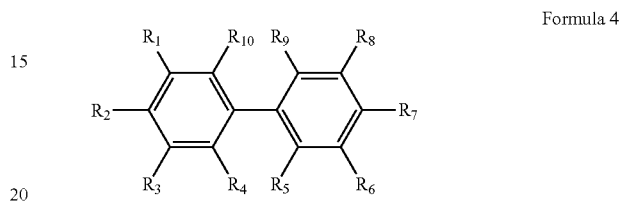

Formula 4 wherein at least one of $R_1$ to $R_{10}$ is —$C_KH_{2K}O$—, —C(=O)O—$(CH_2)_K$—CH(OH)—$(CH_2)_{K'}$—, —$(CH_2)_K$—CH(OH)—$(CH_2)_KO$— or —$C_jH_{2j}NHC(=O)$— and is linked with the acrylate moiety of formula 1 having a repeating unit represented by n, wherein K and K' are each an integer greater than 1 and j is an integer greater than 0, and the remaining radicals of $R_1$ to $R_{10}$ which are the same or different are each a hydrogen atom, an alkyl group having 1 to 15 carbon atoms, an aromatic ring having 6 to 30 carbon atoms, or a compound containing at least one oxygen, nitrogen or sulfur atom;

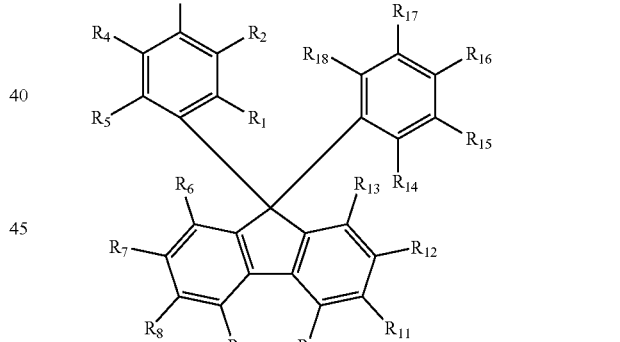

Formula 5 wherein at least one of $R_1$ to $R_{18}$ is —$C_KH_{2K}O$—, —C(=O)O—$(CH_2)_K$—CH(OH)—$(CH_2)_{K'}$—, —$(CH_2)_K$—CH(OH)—$(CH_2)_KO$— or —$C_jH_{2j}NHC(=O)$— and is linked with the acrylate moiety of formula 1 having a repeating unit represented by n, wherein K and K' are each an integer greater than 1 and j is an integer greater than 0, and the remaining radicals of $R_1$ to $R_{18}$ which are the same or different are each a hydrogen atom, an alkyl group having 1 to 15 carbon atoms, an aromatic ring having 6 to 30 carbon atoms, or a compound containing at least one oxygen, nitrogen or sulfur atom.

In the above aspect, the elastic recovery rate represented by equation 1 may be more than 85%.

In the above aspect, $D_1$ preferably satisfies the following equation 2, more preferably the following equation 3, and even more preferably the following equation 4:

$$D_1 \geq \frac{D}{20} \qquad \text{Equation 2}$$

$$D_1 \geq \frac{D}{19} \qquad \text{Equation 3}$$

$$D_1 \geq \frac{D}{17} \qquad \text{Equation 4}$$

wherein D is the height of the optical sheet to which external pressure has not been applied.

In the optical sheet according to one embodiment of the present invention, the curable resin composition may comprise a UV-curable monomer, a photoinitiator and an additive.

In the optical sheet according to one embodiment of the present invention, the surface of the cured layer of resin has a structured shape in which a plurality of three-dimensional structures are linearly or nonlinearly arranged.

The optical sheet according to one embodiment of the present invention may comprise a base layer.

In the optical sheet according to one embodiment of the present invention, the cured layer of resin may be structured by forming a plurality of patterns of at least one selected from the group consisting of: a polyhedral shape which is polygonal, semicircular or semielliptical in cross section; a columnar shape which is polygonal, semicircular or semielliptical in cross section; and a curved columnar shape which is polygonal, semicircular or semielliptical in cross section.

In the optical sheet according to one embodiment of the present invention, the cured layer of resin may be a cured layer of slippery resin containing in the molecular chain an element having a slippery property.

The optical sheet according to one embodiment of the present invention may comprise a cured layer of slippery resin which is formed on the cured layer of resin and contains in the molecular chain an element having a slippery property.

The optical sheet comprising the base layer according to the aspect of the present invention may comprise a cured layer of slippery resin which is formed on the other side of the base layer and contains in the molecular chain an element having a slippery property.

In the above-described embodiments, the element having the slippery property may be F or Si.

In the above-described embodiments, the cured layer of slippery resin may be formed from a curable resin composition containing F or Si.

Herein, the curable resin composition may comprise at least one compound selected from the group consisting of organosilicon compounds and fluoroacrylates.

In an illustrative aspect of the present invention, there is provided a backlight unit assembly comprising, in at least one layer, the optical sheet set forth in the above-described embodiments.

Advantageous Effects

The optical sheet of the present invention can when applied to displays prevent damage to a structured layer even upon the application of external impact. Thus, even when the optical sheet is used in portable displays such as notebook computers and PDAs, it is not readily damaged by external impact occurring upon running or a sudden stop during movement, after the displays are placed in bags.

Also, according to the present invention, damage to a structured layer is prevented, and thus the optical sheet is easy to handle.

Moreover, according to the present invention, a decrease in brightness caused by damage can be prevented, and thus the function of the optical sheet can be maintained over a long period of time.

Meanwhile, according to the present invention, a protective film is not required, and thus the production process can be simplified, production cost can be reduced and production efficiency can be increased.

In addition, according to the present invention, the optical film is not readily damaged either by external impact or by film stacking in production processes, and thus failure rate can be reduced, leading to a reduction in production cost and an increase in production efficiency.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Figure 1:
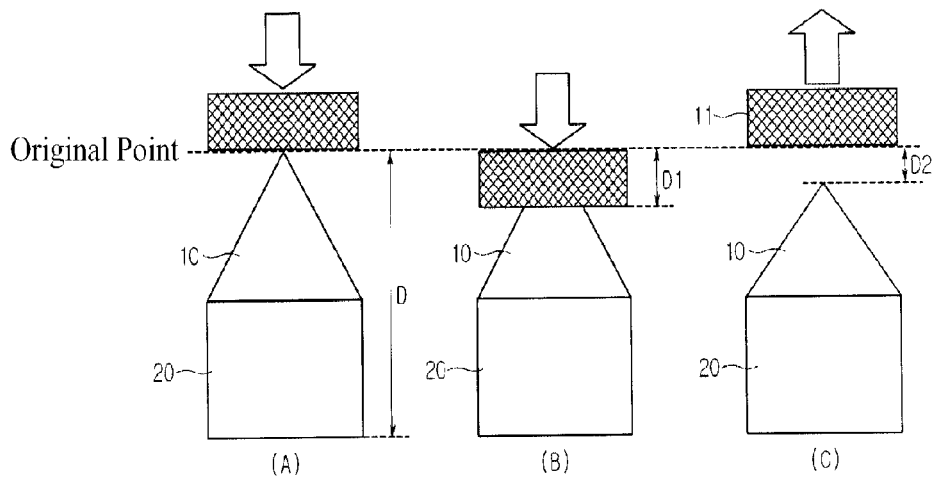
FIG. 1 is a schematic diagram showing a process of testing the elastic recovery rate of an optical sheet.

Hereinafter, the present invention will be described in further detail.

The optical sheet of the present invention is not specifically limited, but may comprise either a cured resin layer whose surface has been structured (hereinafter referred to as structured layer) or a base layer and a structured layer formed on one or both sides of the base layer. The surface of the structured layer has a structured shape in which a plurality of three-dimensional structures are linearly or nonlinearly arranged. Particularly, if the structured surface includes structures which are polygonal in cross section, the optical sheet can be readily damaged by external impact, because the upper portion of the optical sheet has a peak shape. However, even in this case, the optical sheet according to an embodiment of the present invention is not readily damaged by external impact, because it is readily deformed and then readily restored, even when a force is applied.

The elastic recovery rate (represented by the following equation 1) of an optical sheet according to an embodiment of the present invention is preferably more than 80%, and more preferably more than 85%, as measured when pressing the upper side of the structured surface with a flat tip at a pressing speed of 0.2031 mN/sec to a maximum compressive force of 1 $g_f$ or 2 $g_f$, maintaining the structured surface at the maximum compressive force for 5 seconds when the maximum compressive force has been reached, and then removing the compressive force:

$$\text{Elastic recovery rate} = (D_1 - D_2)/D_1 \times 100 \quad \text{Equation 1}$$

wherein $D_1$ signifies a depth compressed by the application of external pressure, and $D_2$ signifies the difference between the height of the optical sheet to which external pressure has not been applied and the height of the optical sheet from which external pressure has been removed to recover the optical sheet.

In the case in which the optical sheet of the present invention satisfies the above elastic recovery rate when pressing the optical sheet as described above and then removing the applied force is removed, the optical sheet has such elasticity that it can flexibly cope with external impact, thereby preventing damage to the structured layer.

However, in the case in which an optical sheet does not satisfy the above elastic recovery rate when pressing the optical sheet as described above and then removing the applied force is removed, the optical sheet is maintained in a state in which the upper portion of the structured layer is pressed down when the optical film comes in contact with other films or is applied with a load, and thus it cannot function as an optical sheet.

In an optical sheet according to a preferred embodiment of the present invention, $D_1$ which signifies a depth compressed by the application of external pressure preferably satisfies the following equation 2, more preferably the following equation 3, and even more preferably the following equation 4:

$$D_1 \geq \frac{D}{20} \quad \text{Equation 2}$$

$$D_1 \geq \frac{D}{19} \quad \text{Equation 3}$$

$$D_1 \geq \frac{D}{17} \quad \text{Equation 4}$$

wherein D is the height of the optical sheet to which external pressure has not been applied.

Namely, the optical sheet of the present invention has such flexibility that the depth compressed by the application of external pressure is more than 1/20 of the height of the optical sheet to which external pressure has not been applied. In this case, when the optical sheet comes in contact with other films or is applied with a load, the upper portion of the structured layer can maintain a normal shape.

When the inventive optical sheet satisfying such characteristics is applied with a great load, the structured layer having three-dimensional structures can be easily compressed, but when the compressed state is removed, the optical sheet is returned close to the original state to the maximum possible degree. Thus, the structured layer is not damaged by external impact.

In an example for providing an optical sheet satisfying such elastic recovery rate, elasticity can be increased when the structured layer is formed such that it contains a polyalkylene glycol chain in the chain. Particularly, if the curable resin composition for forming the structured layer contains a compound of the following formula 1, there is an advantage in terms of satisfying the elastic recovery rate without deteriorating optical properties:

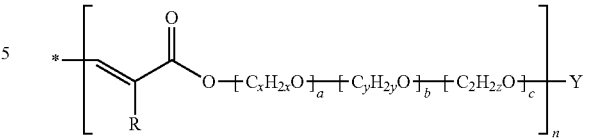

Formula 1 wherein R is a hydrogen atom or an alkyl group having 1 to 15 carbon atoms, n is an integer greater than 1, a, b and c are integers greater than 0, provided a+b+c=3, x, y and z which are the same or different are each an integer ranging from 2 to 50, and Y is a compound containing at least one benzene ring;

In formula 1, the compound containing at least one benzene ring may be selected from among compounds represented by the following formulas 2 to 5. The embodiments of the present invention are not limited to the following illustrative structures, and the elastic sheet illustrated in the present invention can be realized by modifying the linkage structure containing a benzene ring.

Formula 2

[Chemical structure showing two benzene rings connected through a central carbon with substituents $R_1$, $R_{12}$, $R_{10}$, $R_9$, $R_{11}$, $R_2$, $R_8$, $R_5$, $R_3$, $R_4$, $R_6$, $R_7$]

wherein at least one of $R_1$ to $R_{12}$ is $-C_KH_{2K}O-$, $-C(=O)O-(CH_2)_K-CH(OH)-(CH_2)_{K'}-$, $-(CH_2)_K-CH(OH)-(CH_2)_KO-$ or $-C_jH_{2j}NHC(=O)-$ and is linked with the acrylate moiety of formula 1 having a repeating unit represented by n, wherein K and K' are each an integer greater than 1 and j is an integer greater than 0, and the remaining radicals of $R_1$ to $R_{12}$ which are the same or different are each a hydrogen atom, an alkyl group having 1 to 15 carbon atoms, an aromatic ring having 6 to 30 carbon atoms, or a compound containing at least one oxygen, nitrogen or sulfur atom;

Formula 3

[Chemical structure showing a benzene ring with substituents $R_1$, $R_2$, $R_6$, $R_3$, $R_5$, $R_4$]

wherein at least one of $R_1$ to $R_6$ is $-C_KH_{2K}O-$, $-C(=O)O-(CH_2)_K-CH(OH)-(CH_2)_{K'}-$, $-(CH_2)_K-CH(OH)-(CH_2)_KO-$ or $-C_jH_{2j}NHC(=O)-$ and is linked with the acrylate moiety of formula 1 having a repeating unit represented by n, wherein K and K' are each an integer greater than 1 and j is an integer greater than 0, and the remaining radicals of $R_1$ to $R_6$ which are the same or different are each a hydrogen atom, an alkyl group having 1 to 15 carbon atoms, an aromatic ring having 6 to 30 carbon atoms, or a compound containing at least one oxygen, nitrogen or sulfur atom;

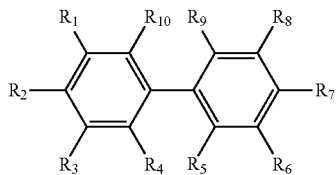

Formula 4 wherein at least one of $R_1$ to $R_{10}$ is —$C_KH_{2K}O$—, —C(=O)O—$(CH_2)_K$—CH(OH)—$(CH_2)_{K'}$—, —$(CH_2)_K$—CH(OH)—$(CH_2)_{K'}O$— or —$C_jH_{2j}NHC(=O)$— and is linked with the acrylate moiety of formula 1 having a repeating unit represented by n, wherein K and K' are each an integer greater than 1 and j is an integer greater than 0, and the remaining radicals of $R_1$ to $R_{10}$ which are the same or different are each a hydrogen atom, an alkyl group having 1 to 15 carbon atoms, an aromatic ring having 6 to 30 carbon atoms, or a compound containing at least one oxygen, nitrogen or sulfur atom;

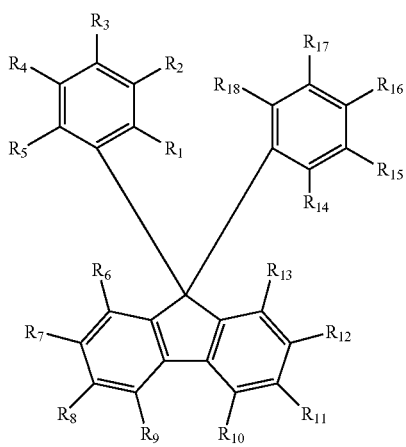

Formula 5 wherein at least one of $R_1$ to $R_{18}$ is —$C_KH_{2K}O$—, —C(=O)O—$(CH_2)_K$—CH(OH)—$(CH_2)_{K'}$—, —$(CH_2)_K$—CH(OH)—$(CH_2)_{K'}O$— or —$C_jH_{2j}NHC(=O)$— and is linked with the acrylate moiety of formula 1 having a repeating unit represented by n, wherein K and K' are each an integer greater than 1 and j is an integer greater than 0, and the remaining radicals of $R_1$ to $R_{18}$ which are the same or different are each a hydrogen atom, an alkyl group having 1 to 15 carbon atoms, an aromatic ring having 6 to 30 carbon atoms, or a compound containing at least one oxygen, nitrogen or sulfur atom.

The compound represented by formula 1 is preferably contained in an amount of 10-90 wt %, and preferably 20-90 wt %, based on the weight of the curable resin composition for forming the structured layer. In this case, it is possible to manufacture a prism film having scratch resistance. If the content of the compound of formula 1 is less than 10 wt %, it will be difficult to achieve the desired elastic properties, and if it exceeds 90 wt %, the elastic recovery rate can be satisfied, but it can adversely affect the brightness, color stability and process stability of the prism sheet.

In the optical sheet according to an embodiment of the present invention, the curable resin composition for forming the structured layer may comprise, in addition to the compound represented by formula 1, other UV-curable monomers. Examples of the UV-curable monomers include tetrahydroperfurylacrylate, 2-(2-ethoxyethoxy)ethylacrylate, 1,6-hexanedioldi(meth)acrylate, benzyl(meth)acrylate, phenoxyethyl(meth)acrylate, phenoxypolyethyleneglycol(meth) acrylate, 2-hydroxy-3-phenoxypropylacrylate, neopentylglycolbenzoate acrylate, 2-hydroxy-3-phenoxypropylacrylate, phenylphenoxyethanolacrylate, caprolactone(meth)acrylate, nonylphenolpolyalkyleneglycol (meth)acrylate, butanediol(meth)acrylate, bisphenol A polyalkyleneglycol-di(meth)acrylate, polyalkyleneglycol-di (meth)acrylate, trimethylpropane tri(meth)acrylate, styrene, methylstyrene, phenylepoxy(meth)acrylate and alkyl(meth) acrylate.

The curable resin composition for forming the structured layer may contain, in addition to the compound of formula 1 and the UV-curable monomers, photoinitiators, for example, phosphine oxide, propanone, ketone or formate, and additives, such as a UV absorber, a UV stabilizer, a diluent, a color stabilizer, a leveling agent, an antioxidant, a defoaming agent or an antistatic agent.

Meanwhile, the structured layer in the optical sheet of the present invention may be a polyhedral shape which is polygonal, semicircular or semielliptical in cross section, a columnar shape which is polygonal, semicircular or semielliptical in cross section, or a curved columnar shape which is polygonal, semicircular or semielliptical in cross section. Alternatively, the structured layer may also be a combination of two or more of these shapes.

Moreover, the structured layer also includes a case having at least one concentrically arranged structure when seen from the top while having a structure in which peaks and valleys are formed along the concentric circle.

If the cross section of the structured layer is polygonal, the variations in brightness and wide viewing angle characteristics according to the angle of the apex are severe. Thus, in consideration of brightness and wide viewing angle, the angle of the apex is preferably 80~100° and more preferably 85~95°.

If the optical sheet according to an embodiment of the present invention comprises a separate base layer, the base layer may be formed of a material selected from the group consisting of polyethylene terephthalate, polyethylene naphthalate, polycarbonate, polystyrene, poly(meth)acrylate, polymethyl(meth)acrylate, polyacrylate, polyimide and polyamide and may also comprise light-diffusing particles so as to form irregularities. The thickness of the base layer is preferably 10-1,000 μm in view of mechanical strength, thermal stability and film flexibility, and in this case, the loss of transmitted light can be prevented.

In another embodiment of the present invention, there is provided an optical sheet which can prevent the adhesion between films while having characteristics of protecting against compression. For this purpose, a cured layer of resin containing, in the molecular chain, an element having a slippery property (hereinafter referred to as the "cured layer of slippery resin") is separately provided on the structured layer. Alternatively, the structured layer may consist of a cured layer of resin having the molecular chain with a slippery property, that is, consist of the cured layer of slippery resin. In an optical sheet according to another embodiment of the present invention, the cured layer of slippery resin may also be formed on the other side of the base layer on which the structured layer is not formed.

In this case, a uniform and continuous slippery property can be provided compared to either adding an inorganic material having a slippery property to the curable resin composition for forming the structured layer or coating the surface of the structured layer with the inorganic material.

An example of the method of allowing the structured layer to become the cured layer of slippery resin includes a method of adding a curable resin containing an element having a slippery property to the curable resin composition for forming the structured layer, and then curing the resin composition. Herein, the curable resin may be at least one selected from the group consisting of organosilicon compounds, including silicon acrylate and siloxane resin, and fluoroacrylates. The content of the curable resin containing an element having slippery property is not specifically limited, but is preferably 0.01-5.0 parts by weight based on the weight of binder components in the curable resin composition for forming the structured layer in terms of preventing a decrease in brightness.

By curing the curable resin composition containing an element having a slippery property as described above, the element having a slippery property can be present in the molecular chain of the structured layer.

In addition to the case in which the structured layer itself is the cured layer of slippery resin, there is a case in which the cured layer of slippery resin is separately provided. In this case, a cured layer of resin containing in the molecular chain an element having a slippery property can be separately provided on the structured layer. The cured layer can be formed by coating the structured layer with a composition which comprises a curable resin, containing an element having a slippery property, and a photoinitiator. When the cured layer of slippery resin is separately coated on the structured layer, a method such as spray coating can be used such that the cured layer can be coated uniformly over the entire surface. In this case, the cured layer of slippery resin can be formed to a thin thickness of less than 1 μm, and a slippery property can be imparted even when the thickness of the cured layer of slippery resin is thin.

Also, the cured layer of slippery resin can be formed not only on the structured layer, but also on the other side of the base layer which is opposite to the structured layer, thus providing a slippery property. Accordingly, damage to the structured layer can be prevented from occurring upon stacking of a plurality of optical sheets.

A method for manufacturing the optical sheet of the present invention is not specifically limited. For example, the method may comprise the steps of: preparing a crude solution comprising a compound represented by the formula 1; coating the crude solution on a frame having a three-dimensional structure carved thereon; bringing one side of a transparent base film (support) into contact with the crude solution coated on the carved frame, and irradiating the coated crude solution with UV light so as to cure it, thus forming a cured layer of resin; and separating the resin cured layer from the carved frame.

Although the description has been made mainly on the optical sheet comprising the base layer separately from the structured layer, it is to be understood that an optical sheet manufactured by extruding one kind of resin without distinguishing the structured layer from the base layer is also within the scope of the present invention.

Hereinafter, the present invention will be described in further detail with reference to the accompanying drawings.

FIG. 1 is a schematic diagram showing a process of testing the elastic recovery rate of an optical sheet.

When a force is applied to a structure layer 10 of an optical sheet using a flat tip 11, the upper side of the structured layer 10 is compressed as shown in FIG. 1(B). Herein, the compressed depth is $D_1$. $D_1$ in the optical sheet of the present invention is preferably more than $1/20$, preferably more than $1/19$, and even more preferably more than $1/17$ of the height (D) of the optical sheet to which external pressure has not been applied. Namely, the optical sheet of the present invention has such flexibility that it can be compressed a lot upon the application of external impact without causing damage.

Then, when the flat tip 11 is removed, the upper side of the structured layer is recovered close to the original state without damage as shown in FIG. 1(C). Herein, the difference between the height of the recovered optical sheet and the height (D) of the optical sheet to which external pressure has not been applied is $D_2$.

Thus, as the difference between the depth compressed by the application of external pressure and the height of the structure recovered after compression, $(D_1-D_2)$, is greater, elasticity is more excellent. In the case of the optical sheet of the present invention, the elasticity recovery rate represented by equation 1 satisfies more than 85%, and more preferably more than 90%. Thus, the optical sheet of the present invention has great $D_1$ while having great $(D_1-D_2)$, suggesting that it has excellent elasticity. Thus, it is compressed a lot upon the application of external pressure, and then is recovered to the original state to the maximum possible extent.

Figure 2:
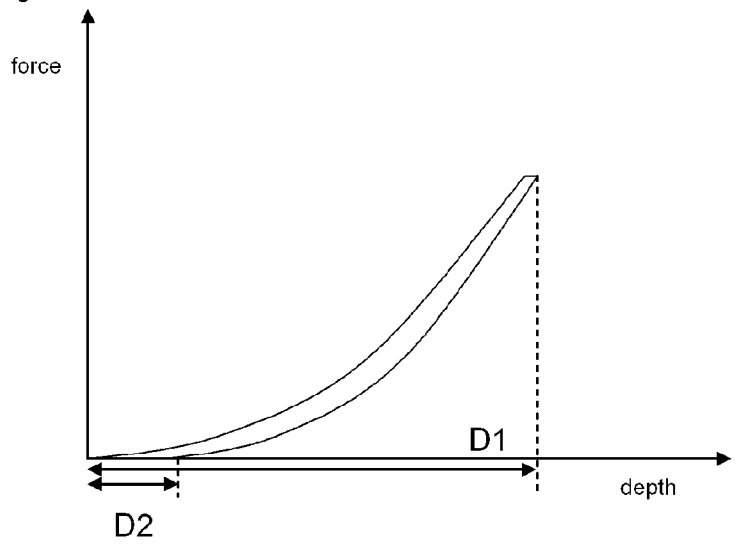
FIG. 2 is a graphic diagram showing the relationship between a force applied to a polymer material having high elastic recovery rate, and $D_1$ and $D_2$.
Figure 3:
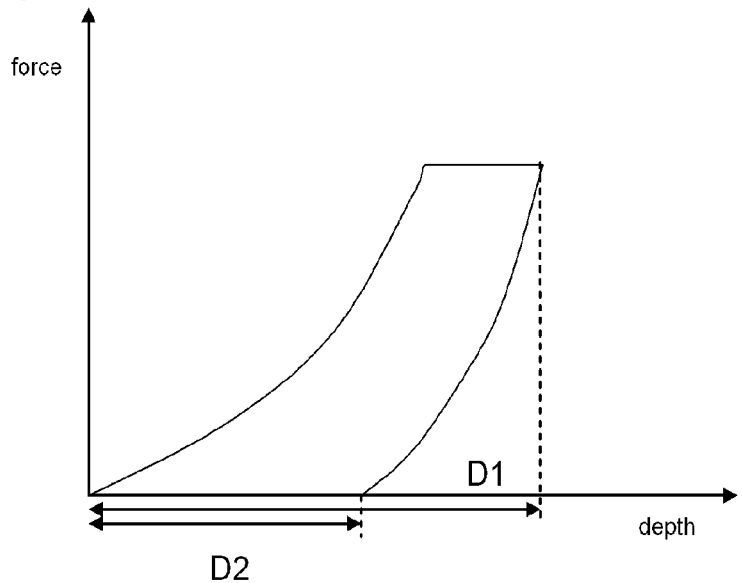
FIG. 3 is a graphic diagram showing the relationship between a force applied to a polymer material having low elastic recovery rate, and $D_1$ and $D_2$.

FIG. 2 is a graphic diagram showing the relationship between a force applied to a polymer material having high elastic recovery rate, and $D_1$ and $D_2$, and FIG. 3 a graphic diagram showing the relationship between a force applied to a polymer material having low elastic recovery rate. For a material having higher elastic recovery rate, the $D_2$ value approaches 0, and for a material having ideal elasticity, the $D_2$ value is 0, indicating the elastic recovery rate is 100%. On the other hand, for a material having lower elasticity, the $D_2$ value approaches $D_1$, and thus the $(D_1-D_2)$ value approaches 0.

The optical sheet of the present invention approximates the graph of FIG. 2, but the polymer material of the present invention is not limited to the curve of the graph of FIG. 2.

Figure 4:
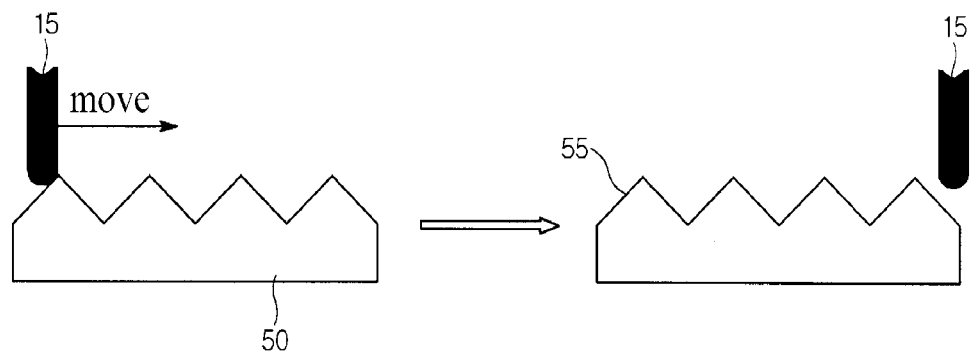
FIG. 4 is a schematic diagram showing a process of applying a scratch to the optical sheet of the present invention using a scratching probe.
Figure 5:
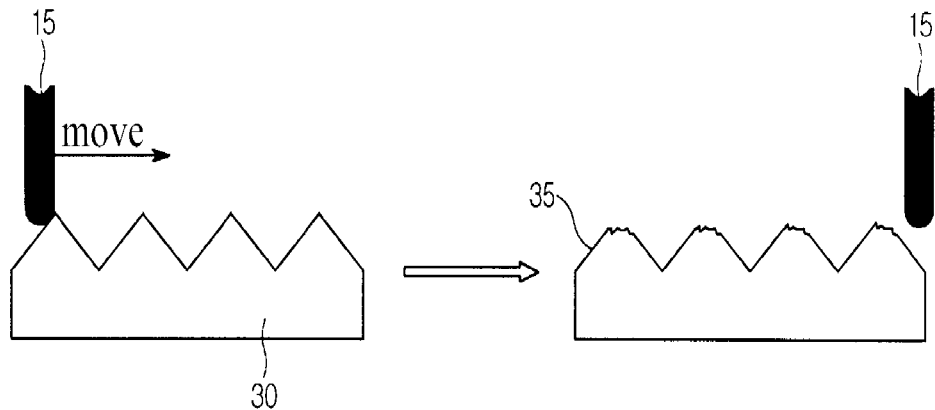
FIG. 5 is a schematic diagram showing a process of applying a scratch to a prior art optical sheet using a scratching probe.

FIG. 4 is a schematic diagram showing a process of applying a scratch to an optical sheet 50 of the present invention using a scratching probe 15, and FIG. 5 is a schematic diagram showing a process of applying a scratch to a prior art optical sheet 30 using a scratching probe 15. As can be seen in FIGS. 4 and 5, in the prior art optical sheet 30, the upper portion of the structured layer 35 is deformed or broken due to the probe 15, and thus much damaged. Unlike this, in the optical sheet of the present invention, the upper portion of the structured layer 55 is not damaged even when the scratch is applied.

Mode For The Invention

Hereinafter, the present invention will be described in further detail with reference to examples, but the scope of the present invention is not limited to these examples.

Preparation of Acrylate Oligomer

SYNTHESIS EXAMPLE 1

In a reflux reactor charged with nitrogen, 500 g of toluene, 14 ml of triethylamine, 39.3 g (0.1 mol) of bisphenol A bischloroformate (Aldrich) and 75.0 g (0.2 mol) of polyethyleneglycol acrylate (Aldrich; number-average molecular weight: 375) were allowed to react at 50° C. for 24 hours. Then, the produced salt was separated by centrifugation and distilled under reduced pressure to remove the solvent and unreacted material, thus preparing an acrylate oligomer represented by formula 1 wherein n=2, R is H, x is 2, y is 0, z is 0, a is 9, b is 0, c is 0, and Y is a compound wherein $R_2$ and $R_8$ in formula 2 are each —OCH$_2$CH$_2$—, R$_5$ and R$_{11}$ are each CH$_3$, and the remaining R radicals are each H.

SYNTHESIS EXAMPLE 2

In a reflux reactor charged with nitrogen, 9.4 g of phenol (Aldrich), 28.8 g of epoxy butane (Aldrich) and 0.05 g of benzyltriethylammonium chloride were added to 200 g of toluene, and then allowed to react at 90° C. for 24 hours. To the reaction product, 15.51 g of isocyanatoethyl methacrylate was added and 0.05 g of dibutyltin laurate (Aldrich) as a catalyst was added. Then, the mixture was allowed to react at 60° C. for 24 hours, and then distilled under reduced pressure to remove unreacted material and the solvent, thus preparing an acrylate oligomer represented by formula 1 wherein n=1, R is CH$_3$, x is 4, y and z are each 0, a=4, b and c=0, and Y is a compound Y wherein R$_1$ in formula 3 is —OC=ONHCH$_2$CH$_2$—, and the remaining R radicals are each H.

SYNTHESIS EXAMPLE 3

In a reflux reactor charged with nitrogen, 92 g (0.1 mol) of polypropyleneglycol monoacrylate (BISOMER PPA6, LARPORTE), 0.04 g of tin chloride (Aldrich) and 10.17 g (0.11 mol) of epichlorohydrin were added to 200 g of toluene and stirred at 80° C. for 24 hours. The reaction product was desalted using a 50% NaOH aqueous solution, and the NaCl salt was removed using a separatory funnel. The remaining material was distilled under reduced pressure, and 47.9 g (0.05 mol) of the distilled product was added to 200 g of toluene. Then, 10.1 g (0.051 mol) of 2-biphenylcarboxylic acid (Aldrich) and 0.05 g of benzyltriethylammonium chloride were added thereto, and then allowed to react at 90° C. for 24 hours. Then, the reaction product was distilled in reduced pressure to remove unreacted material and the solvent, thus preparing an acrylate oligomer represented by formula 1 wherein n=1, R is H, x=3, y=0, z=0, b and c are each 0, a=5, and Y is a compound wherein R$_2$ in formula 4 is —C(=O)OCH$_2$CH(OH)CH$_2$—.

SYNTHESIS EXAMPLE 4

In a reflux reactor charged with nitrogen, 500 g of toluene, 14 ml of triethylamine, 35.4 g (0.1 mol) of bisphenol fluorene (Osaka Gas Co. Ltd.; BPF) and 75.0 g (0.2 mol) of polyethyleneglycol acrylate (Aldrich; number-average molecular weight: 375) were allowed to react at 50° C. for 24 hours. The produced salt was separated by centrifugation and distilled under reduced pressure to remove unreacted material and the solvent, thus preparing an acrylate oligomer represented by formula 1 wherein n=2, R is H, x=2, y=0, z=0, a=6, b=0, c=0, and Y is a compound wherein R$_3$ and R$_{16}$ in formula 5 is each —OCH$_2$CH$_2$—, and the remaining R radicals are each H.

SYNTHESIS EXAMPLE 5

In a reflux reactor charged with nitrogen, 500 g of toluene, 14 ml of triethylamine, 39.3 g (0.1 mol) of bisphenol A bischloroformate (Aldrich) and 160.0 g (0.2 mol) of polyethyleneglycol acrylate (Aldrich; number-average molecular weight: 800) were allowed to react at 50° C. for 24 hours. Then, the produced salt was separated by centrifugation and distilled under reduced pressure to remove the solvent and unreacted material, thus preparing an acrylate oligomer represented by formula 1 wherein n=2, R=H, x=2, y=0, z=0, a=15, b and c=0, and Y is a compound wherein R$_2$ and R$_8$ in formula 2 are each —OCH$_2$CH$_2$—, R$_5$ and R$_{11}$ are each CH$_3$, and the remaining R radicals are each H.

SYNTHESIS EXAMPLE 6

In a reflux reactor charged with nitrogen, 34.0 g (0.1 mol) of bisphenol A diglycidylether was added to 200 g of toluene. Then, 160.0 g (0.2 mol) of polyethyleneglycol acrylate (Aldrich; number-average molecular weight: 800) and 0.05 g of benzyltriethylammonium chloride were added thereto, and then allowed to react at 90° C. for 24 hours. The reaction product was distilled under reduced pressure to remove unreacted material and the solvent, thus preparing an acrylate oligomer wherein n=2, R=H, x=2, y=0, z=0, a=15, b and c=0, and Y is a compound wherein R$_2$ and R$_8$ in formula 2 are each —CH$_2$—CH(OH)—CH$_2$O—, R$_5$ and R$_{11}$ are each CH$_3$, and the remaining R radicals are each H.

SYNTHESIS EXAMPLE 7

An acrylate oligomer (Miwon Commercial Co., Ltd.; M240) represented by formula 1 wherein n=2, R=H, x=2, y and z=0, a=2, b and c=0, and Y is a compound wherein R$_2$ and R$_7$ in formula 2 is each —OCH$_2$CH$_2$—, R$_{11}$ and R$_5$ are each CH$_3$, and the remaining R radicals are each H, was prepared.

Production of Optical Sheet

EXAMPLE 1

Based on 100 parts by weight of a composition, 70 parts by weight of the acrylate oligomer prepared in Synthesis Example 1, 10 parts by weight of phenoxyethylmethacrylate (Sartomer, SR340), 15 parts by weight of phenoxyethylacrylate (Sartomer, SR339), 1.5 parts by weight of photoinitiator 2,4,6-trimethylbenzoyl diphenylphosphinoxide, 1.5 parts by weight of photoinitiator methylbenzoylformate and 2.0 parts by weight of additive bis(1,2,2,6,6-pentamethyl-4-piperidyl) sebacate were mixed with each other at 60° C. for 1 hour to prepare a composition. Then, the composition was applied to one side of the substrate layer polyethyleneterephthalate (KOLON Co., Ltd.; 188 µm thickness) and placed on the prism-shaped frame of a roller at 35° C. The applied composition was irradiated with UV light at a dose of 900 mJ/cm$^2$ in the direction of the base layer using a UV lamp equipped with a type-D bulb (Fusion Co., Ltd.; 600 Watt/inch$^2$), thus forming linear triangular prisms having a prism apex angle of 90°, a pitch of 50 µm and a height of 27 µm, thereby manufacturing an optical sheet (D=215 µm).

EXAMPLE 2

According to the method of Example 1, lenticular lenses having a semicircular cross section, a pitch of 50 µm and a height of 27 µm were formed, thus manufacturing an optical sheet.

EXAMPLE 3

According to the method of Example 1, linear prisms having a semicircular cross section, a pitch of 50 µm and a height of 27 µm were formed, thus manufacturing an optical sheet.

EXAMPLE 4

According to the method of Example 1, linear prisms having a pentagonal cross section, an apex angle of 95°, a pitch of 50 µm and a height of 27 µm were formed, thus manufacturing an optical sheet.

EXAMPLE 5

According to the method of Example 1, wave-shaped prisms having a semicircular cross section, a pitch of 50 μm and a height of 27 μm were formed, thus manufacturing an optical sheet.

EXAMPLE 6

An optical sheet was manufactured in the same manner as described in Example 1, except that the acrylate oligomer obtained in Synthesis Example 2 was used.

EXAMPLE 7

An optical sheet was manufactured in the same manner as described in Example 1, except that the acrylate oligomer obtained in Synthesis Example 3 was used.

EXAMPLE 8

An optical sheet was manufactured in the same manner as described in Example 1, except that the acrylate oligomer obtained in Synthesis Example 4 was used.

EXAMPLE 9

An optical sheet was manufactured in the same manner as described in Example 1, except that the acrylate oligomer obtained in Synthesis Example 5 was used.

EXAMPLE 10

An optical sheet was manufactured in the same manner as described in Example 1, except that the acrylate oligomer obtained in Synthesis Example 6 was used.

COMPARATIVE EXAMPLE 1

As an optical sheet, a BEF III prism film (3M Corp.) was used (D=215 μm).

COMPARATIVE EXAMPLE 2

As an optical sheet, a Brtie-200 prism film (Doosan, Korea) was used (D=215 μm).

COMPARATIVE EXAMPLE 3

As an optical sheet, an LES-T2 prism film (LG, Korea) was used (D=220 μm).

COMPARATIVE EXAMPLE 4

70 parts by weight of the acrylate oligomer prepared in Synthesis Example 7, 10 parts by weight of phenoxyethylmethacrylate (Sartomer, SR340), 15 parts by weight of phenoxyethylacrylate (Sartomer, SR339), 1.5 parts by weight of photoinitiator 2,4,6-trimethylbenzoyl diphenylphosphinoxide, 1.5 parts by weight of photoinitiator methylbenzoylformate and 2.0 parts by weight of additive bis(1,2,2,6,6-pentamethyl-4-piperidyl)sebacate were mixed with each other at 60° C. for 1 hour to prepare a composition.

Then, the composition was applied to one side of the substrate layer polyethyleneterephthalate (KOLON Co., Ltd.; 188 μm thickness) and placed on the prism-shaped frame of a roller at 35° C. The applied composition was irradiated with UV light at a dose of 900 mJ/cm$^2$ in the direction of the base layer using a UV lamp equipped with a type-D bulb (Fusion Co., Ltd.; 600 Watt/inch$^2$), thus forming linear triangular prisms having a prism apex angle of 90°, a pitch of 50 μm and a height of 27 μm, thereby manufacturing an optical sheet (D=215 μm).

The $D_1$, elastic recovery rate and scratch resistance of the optical sheet manufactured in each of Examples and Comparative Examples were measured in the following manner.

(1) $D_1$ and Elastic Recovery Rate

The optical sheets manufactured in the Examples and Comparative Examples were measured for $D_1$ and the elastic recovery rate by the 'Load-Unload test' mode using a micro hardness tester (Shimadzu DUH-W201S). The peak-shaped portion of the structured layer of the optical sheet was positioned such that it was brought into contact with the central portion of a flat tip having a diameter of 50 μm. Then, $D_1$ and the elastic recovery rate were repeatedly measured five times under the following conditions, and the measurements were averaged. The measurement results are shown in Table 1 below.

[Measurement Conditions 1]
a. maximum compressive force applied: 1 $g_f$(=9.807 mN)
b. compressive force applied per hour: 0.2031 mN/sec
c. holding time at maximum compressive force: 5 sec

[Measurement Conditions 2]
a. maximum compressive force applied: 2 $g_f$(=19.614 mN)
b. compressive force applied per hour: 0.2031 mN/sec
c. holding time at maximum compressive force: 5 sec (2) Scratch Resistance When the minimum pressure was applied to the optical sheets of the Examples and Comparative Examples using a basic weight by a Big Heart test device (IMOTO Co., Ltd.), whether a scratch occurred in the structural layer was measured. The measurement results are shown in Table 1 below. The degree of damage was visually evaluated based on the following criteria:

Poor scratch resistance←x<Δ<○<◎→excellent scratch resistance

TABLE 1

| | | Measurement conditions 1 | | | Measurement conditions 2 | | | |
|---|---|---|---|---|---|---|---|---|
| | D (μm) | $D_1$ (μm) | $D_2$ (μm) | Elastic recovery rate (%) | $D_1$ (μm) | $D_2$ (μm) | Elastic recovery rate (%) | Scratch resistance |
| Example 1 | 215 | 11.350 | 1.566 | 86.2 | 12.850 | 1.799 | 86.0 | ◎ |
| Example 2 | 215 | 11.350 | 1.225 | 89.2 | 12.855 | 1.632 | 87.3 | ◎ |
| Example 3 | 215 | 11.352 | 1.078 | 90.5 | 12.905 | 1.509 | 88.3 | ◎ |
| Example 4 | 215 | 11.349 | 0.794 | 93.0 | 12.928 | 0.969 | 92.5 | ◎ |
| Example 5 | 215 | 11.280 | 1.635 | 85.5 | 12.788 | 1.905 | 85.1 | ◎ |
| Example 6 | 215 | 11.360 | 1.442 | 87.3 | 12.954 | 1.554 | 88.0 | ◎ |
| Example 7 | 215 | 11.299 | 1.321 | 88.3 | 12.846 | 1.348 | 89.5 | ◎ |

TABLE 1-continued

| | | Measurement conditions 1 | | | Measurement conditions 2 | | | |
|---|---|---|---|---|---|---|---|---|
| | D (μm) | $D_1$ (μm) | $D_2$ (μm) | Elastic recovery rate (%) | $D_1$ (μm) | $D_2$ (μm) | Elastic recovery rate (%) | Scratch resistance |
| Example 8 | 215 | 10.835 | 1.527 | 85.9 | 12.855 | 1.773 | 86.2 | ◎ |
| Example 9 | 215 | 11.258 | 1.489 | 86.7 | 12.958 | 1.750 | 86.5 | ◎ |
| Example 10 | 216 | 11.158 | 1.387 | 87.6 | 12.899 | 1.698 | 86.8 | ◎ |
| Comparative Example 1 | 215 | 2.892 | 0.699 | 75.8 | 3.502 | 0.903 | 74.2 | X |
| Comparative Example 2 | 215 | 4.846 | 1.187 | 75.5 | 5.235 | 1.188 | 77.3 | Δ |
| Comparative Example 3 | 220 | 4.389 | 1.198 | 72.7 | 5.200 | 1.346 | 74.1 | Δ |
| Comparative Example 4 | 215 | 9.584 | 1.935 | 79.8 | 10.500 | 2.226 | 78.8 | ○ |

As can be seen in Table 1 above, the scratch resistance of the structured layer in the inventive optical sheets of Examples having an elastic recovery rate of more than 80% was very excellent. Thus, it can be seen that the optical sheet of the present invention is much compressed upon application of external impact without causing damage to the structured layer, and then is recovered close to the original state. Thus, the optical sheet of the present invention can flexibly cope with external impact and is not readily damaged.

EXAMPLE 11

Based on 100 parts by weight of the total composition, 69.5 parts by weight of the acrylate oligomer prepared in Synthesis Example 1, 10 parts by weight of phenoxyethylmethacrylate (Sartomer, SR340), 15 parts by weight of phenoxyethylacrylate (Sartomer, SR339), 1.5 parts by weight of photoinitiator 2,4,6-trimethylbenzoyl diphenylphosphinoxide, 1.5 parts by weight of photoinitiator methylbenzoylformate, 2.0 parts by weight of additive bis(1,2,2,6,6-pentamethyl-4-piperidyl)sebacate and 0.5 parts by weight of silicon acrylate were mixed with each other at 60° C. for 1 hour to prepare a composition. Then, the composition was applied to one side of the substrate layer polyethyleneterephthalate (KOLON Co., Ltd.; 188 μm thickness) and placed on the prism-shaped frame of a roller at 35° C. The applied composition was irradiated with UV light at a dose of 900 mJ/cm² in the direction of the base layer using a UV lamp equipped with a type-D bulb (Fusion Co., Ltd.; 600 Watt/inch²), thus forming linear triangular prisms having a prism apex angle of 90°, a pitch of 50 μm and a height of 27 μm, thereby manufacturing an optical sheet (D=215 μm).

EXAMPLE 12

On the structured layer of the optical sheet obtained in Example 1, a curable composition comprising silicon acrylate and photoinitiator diphenyl (2,4,6-trimethylbenzoyl) phosphinoxide (photoinitiator content: 1.5 parts by weight based on 100 parts by weight of silicon acrylate) was applied by a spray method. The applied composition was irradiated with UV light at a dose of 300 mJ/cm² in the direction of the structured layer using a UV lamp equipped with a type-D bulb (Fusion; 600 Watt/inch²), thus manufacturing an optical sheet comprising a cured layer of slippery resin on the structured layer (D=216 μm).

EXAMPLE 13

On the other side of the base layer of the optical sheet manufactured in Example 1, a curable composition comprising silicon acrylate and photoinitiator diphenyl (2,4,6-trimethylbenzoyl)phosphinoxide (photoinitiator content: 1.5 parts by weight based on 100 parts by weight of silicon acrylate) was applied by a spray method. The applied composition was irradiated with UV light at a dose of 900 mJ/cm² in the direction of the base layer using a UV lamp equipped with a type-D bulb (Fusion; 600 Watt/inch²), thus manufacturing an optical sheet comprising a cured layer of slippery resin on the other side of the base layer which is opposite to the structured layer (D=216 μm).

The D1, elastic recovery resistance and scratch resistance of the optical sheets manufactured in Examples 11 to 13 were measured in the above-described manner.

Also, the adhesion of the optical sheets was evaluated in the following manner. A weight of 100 g was placed on the backlight unit for 5 seconds, and then the weight was removed. Then, whether the adhesion between the sheets occurred was evaluated, and the degree of adhesion was visually evaluated based on the following criteria:

Poor adhesion (adhesion between sheets occurred) ←x<Δ<○<◎→excellent adhesion (adhesion between sheets did not occur)

The measurement results are shown in Table 2 below.

TABLE 2

| | | Measurement conditions 1 | | | Measurement conditions 2 | | | | |
|---|---|---|---|---|---|---|---|---|---|
| | D (μm) | $D_1$ (μm) | $D_2$ (μm) | Elastic recovery rate (%) | $D_1$ (μm) | $D_2$ (μm) | Elastic recovery rate (%) | Scratch resistance | Adhesion |
| Example 11 | 215 | 11.350 | 1.566 | 86.2 | 12.850 | 1.799 | 86.0 | ◎ | ◎ |
| Example 12 | 215 | 11.350 | 1.225 | 89.2 | 12.855 | 1.632 | 87.3 | ◎ | ◎ |
| Example 13 | 215 | 11.352 | 1.078 | 90.5 | 12.905 | 1.509 | 88.3 | ◎ | ◎ |

As can be seen from the results shown in Table 2, it is more advantageous to use the curable resin containing an element having a slippery property, because there is no adhesion between sheets.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An optical sheet comprising a cured layer of resin whose surface has been structured and which is made of a curable resin composition comprising a compound of the following Formula 1 and a curable resin, said curable resin containing in a molecular chain an element having a slippery property, wherein the content of the compound represented by Formula 1 is 10-90 parts by weight based on the weight of the curable resin composition, and the content of the curable resin is 0.01-5.0 parts by weight based on the weight of the curable resin composition, wherein the elastic recovery rate of the optical sheet, which is represented by the following Equation 1, is more than 80% as measured when pressing the structured surface with a flat tip at a pressing speed of 0.2031 mN/sec to a maximum compressive force of 1 $g_f$ or 2 $g_f$, maintaining the structured surface at the maximum compressive force for 5 seconds when the maximum compressive force has been reached, and then removing the compressive force:

Formula 1

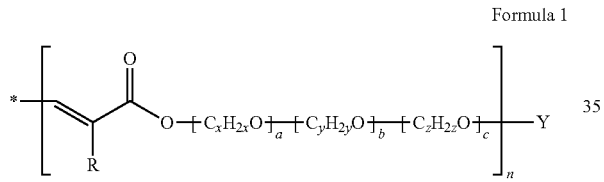

wherein R is a hydrogen atom or an alkyl group having 1 to 15 carbon atoms, n is an integer greater than 1, a, b and c are each an integer greater than 0, provided a+b+c=3, x, y and z which are the same or different are each an integer ranging from 2 to 50, and Y is a compound containing at least one benzene ring;

Elastic recovery rate=$(D_1-D_2)/D_1 \times 100$      Equation 1 wherein $D_1$ signifies a depth compressed by the application of external pressure, and $D_2$ signifies the difference between the height of the optical sheet to which external pressure has not been applied and the height of the optical sheet from which external pressure has been removed to recover the optical sheet, wherein the compound containing at least one benzene ring is selected from the group consisting of the compounds represented by the following Formulas 2 to 4:

Formula 2

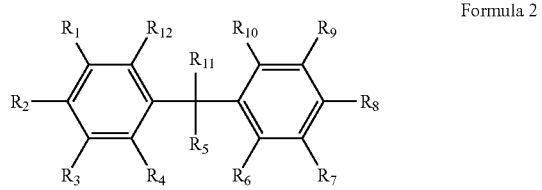

wherein at least one of $R_1$ to $R_4$, $R_6$ to $R_{10}$, and $R_{12}$ is —$C_KH_{2K}O$—, —C(=O)O—$(CH_2)_K$—CH(OH)—$(CH_2)_{K'}$—, —$(CH_2)_K$—(CH(OH)—$(CH_2)_K$O— or —$C_jH_{2j}$NHC(=O)—, wherein K and K' are each an integer greater than 1 and j is an integer greater than 0, and the remaining radicals of $R_1$ to $R_4$, $R_6$ to $R_{10}$, and $R_{12}$ which are the same or different are each a hydrogen atom, an alkyl group having 1 to 15 carbon atoms, an aromatic ring having 6 to 30 carbon atoms, or a compound containing at least one oxygen, nitrogen or sulfur atom and wherein $R_5$ and $R_{11}$ are independently $CH_3$;

Formula 3

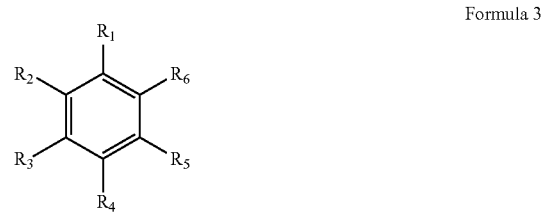

wherein at least one of R1 to R6 is —C(=O)O—$(CH_2)_K$—CH(OH)—$(CH_2)_{K'}$—, —$(CH_2)_K$—CH(OH)—$(CH_2)_K$O— or —$C_jH_{2j}$NHC(=O)—, wherein K and K' are each an integer greater than 1 and j is an integer greater than 0, and the remaining radicals of $R_1$ to $R_6$ which are the same or different are each a hydrogen atom, an alkyl group having 1 to 15 carbon atoms, an aromatic ring having 6 to 30 carbon atoms, or a compound containing at least one oxygen, nitrogen or sulfur atom;

Formula 4

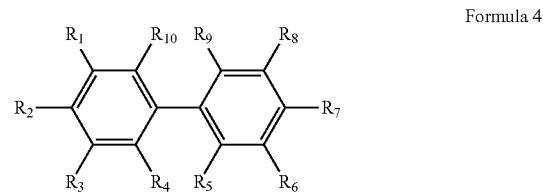

wherein at least one of $R_1$ to $R_{10}$ is —C(=O)O—$(CH_2)_K$—CH(OH)—$(CH_2)_{K'}$—, —$(CH_2)_K$—CH(OH)—$(CH_2)_K$O— or —$C_jH_{2j}$NHC(=O)—, wherein K and K' are each an integer greater than 1 and j is an integer greater than 0, and the remaining radicals of $R_1$ to $R_{10}$ which are the same or different are each a hydrogen atom, an alkyl group having 1 to 15 carbon atoms, an aromatic ring having 6 to 30 carbon atoms, or a compound containing at least one oxygen, nitrogen or sulfur atom.

2. The optical sheet of claim 1, which has an elastic recovery rate of more than 85%.

3. The optical sheet of claim 1, wherein $D_1$ satisfies the following equation 2:

$$D_1 \geq \frac{D}{20}$$      Equation 2 wherein D is the height of the optical sheet to which external pressure has not been applied.

4. The optical sheet of claim 3, wherein $D_1$ satisfies the following equation 3:

$$D_1 \geq \frac{D}{19} \quad \text{Equation 3}$$

wherein D is the height of the optical sheet to which external pressure has not been applied.

5. The optical sheet of claim 4, wherein $D_1$ satisfies the following equation 4:

$$D_1 \geq \frac{D}{17} \quad \text{Equation 4}$$

wherein D is the height of the optical sheet to which external pressure has not applied.

6. The optical sheet of claim 1, wherein the curable resin composition comprises a UV-curable monomer, a photoinitiator and an additive.

7. The optical sheet of claim 1, wherein the surface of the cured layer of resin has a shape in which a plurality of three-dimensional structures are linearly or nonlinearly arranged.

8. The optical sheet of claim 1, which comprises a base layer.

9. The optical sheet of claim 1, wherein the cured layer of resin is structured by forming a plurality of patterns of at least one selected from the group consisting of: a polyhedral shape which is polygonal, semicircular or semielliptical in cross section; a columnar shape which is polygonal, semicircular or semielliptical in cross section; and a curved columnar shape which is polygonal, semicircular or semielliptical in cross section.

10. The optical sheet of claim 1, wherein the cured layer of resin is a cured layer of slippery resin containing, in the molecular chain thereof, an element having a slippery property; and wherein the element having the slippery property is F or Si.

11. The optical sheet of claim 1, which comprises a cured layer of slippery resin which is formed on the cured layer of resin and contains in the molecular chain thereof an element having a slippery property; and wherein the element having the slippery property is F or Si.

12. The optical sheet of claim 8, which comprises a cured layer of slippery resin which is formed on the other side of the base layer and contains in the molecular chain thereof an element having a slippery property; and wherein the element having the slippery property is F or Si.

13. The optical sheet of claim 10, wherein the cured layer of slippery resin is formed from a curable resin composition containing F or Si.

14. The optical sheet of claim 13, wherein the curable resin composition comprises at least one compound selected from the group consisting of organosilicon compounds and fluoroacrylates.

15. A backlight unit assembly comprising the optical sheet of claim 1 in at least one layer.

* * * * *